Figure 1:
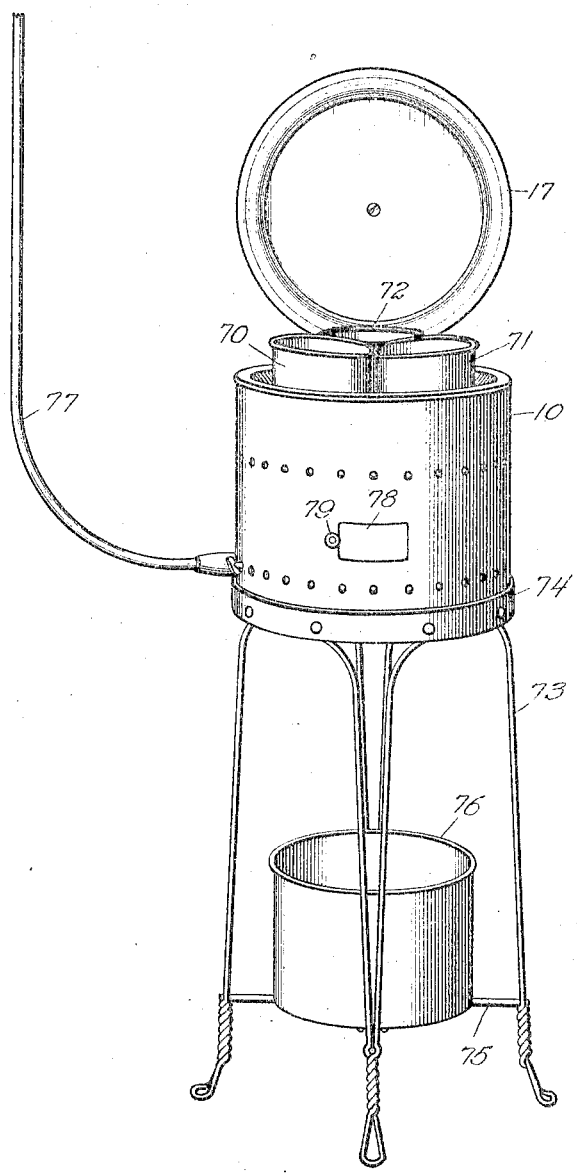

N. S. HARTER.
CULINARY UTENSIL.
APPLICATION FILED JAN. 3, 1913.

1,087,943.

Patented Feb. 24, 1914.
3 SHEETS—SHEET 1.

Witnesses:
Robert H. Weir
Wilson Allen

Inventor
Noah S. Harter.
by Forée Bain May
Attys.

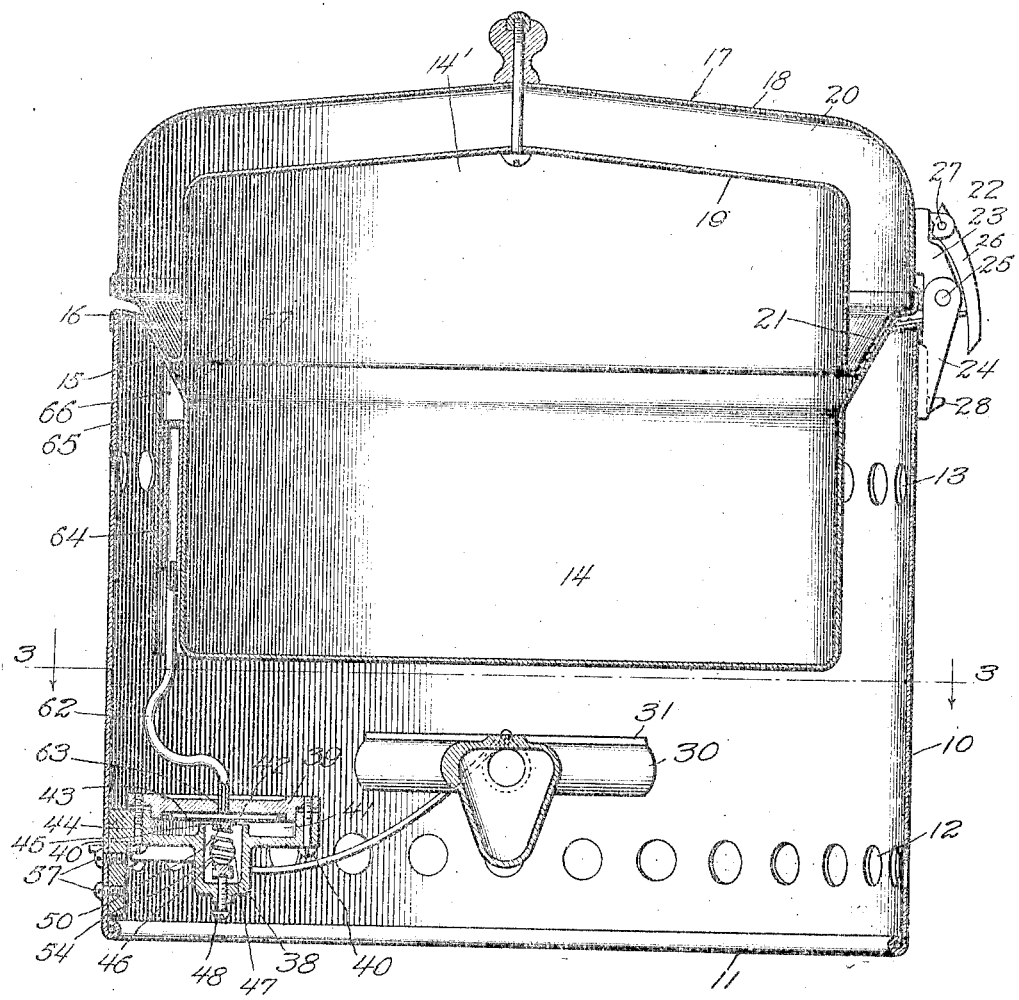

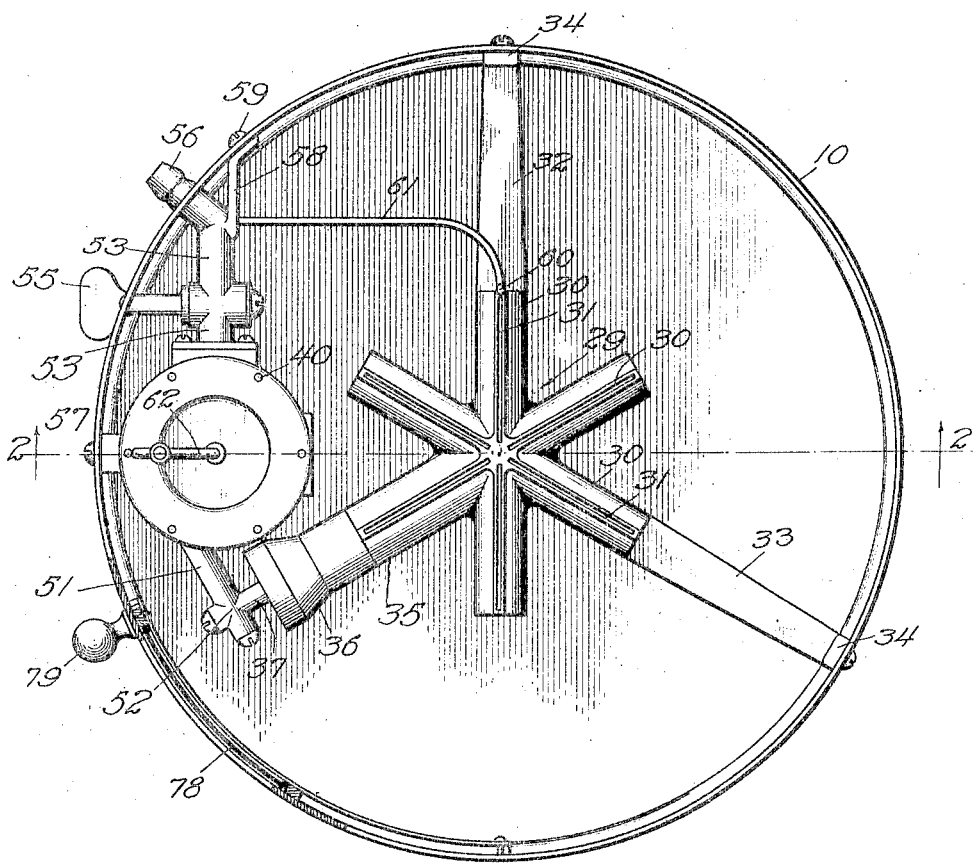

UNITED STATES PATENT OFFICE.

NOAH S. HARTER, OF WAUKEGAN, ILLINOIS, ASSIGNOR TO THE HARTER COMPANY, OF WAUKEGAN, ILLINOIS, A CORPORATION OF ILLINOIS.

CULINARY UTENSIL.

1,087,943.　　　　Specification of Letters Patent.　　Patented Feb. 24, 1914.

Application filed January 3, 1913. Serial No. 739,896.

*To all whom it may concern:*

Be it known that I, NOAH S. HARTER, a citizen of the United States, residing at Waukegan, in the county of Lake and State of Illinois, have invented certain new and useful Improvements in Culinary Utensils, of which the following is a specification.

My invention relates to improvements in culinary utensils, and has especial reference to devices of this general character wherein the variation of the interior temperature of the cooking vessel serves to control the application of heat thereto.

One of the objects of my invention is to automatically control a source of heat supply, or fuel, when the temperature within the heated chamber rises above or falls below a predetermined degree.

Another object of my invention is to provide a temperature-responsive device, and to locate it within an auxiliary chamber, adjacent to, and communicating with but separated from the cooking chamber. And still another object of my invention is to provide means for causing a reverse draft of relatively cool air to pass through the auxiliary chamber or flue containing the fuel-controlling device, when the top or cover of the cooking utensil is raised or removed thereby to increase, at that time, the heat applied to the cooking chamber.

Other and further objects of my invention will become readily apparent to persons skilled in the art from a consideration of the following description when taken in conjunction with the drawings, wherein—

Figure 1 is a perspective elevation of the device in its preferred form, showing the cooking utensil open and mounted on a stand; Fig. 2 is an enlarged vertical section of the utensil; and Fig. 3 is a section taken on line 3—3 of Fig. 2.

In all the views the same reference characters indicate similar parts.

In the particular embodiment which I have chosen for the purpose of clear disclosure of my invention, 10 is an open ended cylindrical jacket provided with a strengthening bead 11 around its bottom edge and having near the bottom edge a row of openings or apertures 12 and near the top edge a similar row of apertures 13.

14 is a cooking receptacle or vessel flaring outwardly near its top edges, as at 15, and preferably provided with a downturned rim 16. This vessel is readily separable or removable from the jacket 10, being supported thereon by the overhanging edge portion 16. A double wall cover 17 is provided by an outer wall 18 and an inner wall 19 with a heat insulating air space 20 therebetween. By this means, heat is prevented from radiating from the vessel 14 and a space 14' is provided above the vessel for containing steam or hot air and for preventing the vessel 14 from being entirely filled.

The inner wall 19 is outwardly tapering, as at 21, at about the same angle as the taper 15 of the vessel 14, to provide therebetween a substantially steam tight joint when the top is in position over the vessel 14. The top 17 is loosely hinged to the jacket 10 by means of a hinge 22 provided by the member 23, secured to the top, and the member 24, secured to the jacket, said members being hinged together by the pintle 25. A tongue 26 is loosely pivoted to the upper hinge member 23, as at 27, which will engage a stop 28 on the lower hinge member 24 when the top is raised and leaned slightly rearwardly, in which position the tongue 26 will support the top.

A gas burner 29 consists of a plurality of radially disposed arms 30, having gas emitting apertures or slots 31 in their upper surfaces. Two of the arms are radially extended, as at 32 and 33, to provide means, as at 34, for supporting the said burner in the jacket 10. An arm 35 of the burner is provided with an open ended cap 36, having secured in the center thereof a gas pipe 37 by which to introduce gas into the burner members.

A gas-receiving casing 38 is provided with a top 39 which is secured thereto by means of screws 40. The casing 38 is divided into chambers 41, 42, and 46, by means of the diaphragm 43, which is preferably secured in the annular depression in the cap or cover 39 by solder, or otherwise, as at 44. The diaphragm is adapted to be seated upon an annular rim or valve seat, 45, which surrounds the chamber 46. An open compression spring 47 is seated against the center of the diaphragm 43 and is adapted to be adjusted by means of the screw 48 which presses against the block 49, secured to the lower end of the spring. A similar block 50 is secured also to the upper end thereof and bears directly against the diaphragm.

The gas pipe 51, which is connected to the gas pipe 37, as at 52, enters the annular chamber 41 below the diaphragm 43, and a gas-supply pipe 53 enters the cylindrical chamber 46 as shown by the opening 54. A gas-controlling cock 55 is located in the pipe 53 and controls the admission of the gas that comes through the hose nozzle 56. The nozzle 56 is adapted for connection with the hose for supply of gas to the burner.

The casing 38 is secured to the jacket 10 as by screws 57, as a means for supporting the gas burner 29; and as a further means for supporting the burner part thereof, an arm 58 may be secured to the jacket 10, as by screws 59. An ignition burner 60 is located near one of the openings in one of the arms 30 of the gas burner 29 and is connected to the pipe 53, as by the small pipe 61, so as to supply a small constantly burning flame for igniting the burner when the gas cock 55 is turned in the proper direction.

A small pipe 62 is connected to the center of the top or cap 39 of the controlling device and communicates with the chamber 42 above the diaphragm. It terminates in a thin walled receptacle 64 adapted to be located near the vertical wall of the vessel 14 when the latter is in place. It is inclosed in a small vertically extending flue, provided by the cap portion 65, which freely encompasses the receptacle 64, the cap portion being secured permanently to the outside vertical wall of the vessel 14. The lower end of the flue 66 is open, and communication is established between the upper end of the flue 66 and the interior of the vessel 14 by means of a plurality of perforations 67.

The operation of the device is substantially as follows: With the parts in the positions shown in Fig. 2 and the vessel 14 containing food to be steamed or boiled, when the gas cock 55 is turned so as to admit gas into the burner 29, the gas is immediately ignited by the lighting burner 60. The spring 47 at this time holds the diaphragm 43 away from the seat 45 and permits gas to pass from the pipe 53 through the opening 54 into the chamber 46 and from the chamber 46 into the chamber 41, between the seat 45 and the bottom surface of the diaphragm 43. From the chamber 41 it passes through the pipe 51 into the pipe 37 and thence into the burner, and gas will thus continue to pass into the burner 29 so long as the diaphragm 43 is unseated or raised above from the annular seat 45 of the chamber 46. When the pressure of the spring 47, however, is overcome and the diaphragm is caused to be seated upon the annular seat 45 gas will be shut off from the burner 29. When the temperature begins to rise in the vessel 14, a small quantity of hot air or steam will begin to leave the vessel 14 and pass through the orifices 67 down to flue 66, thus heating the air or other fluid within the receptacle 64, and thereby expanding the fluid contained in the said receptacle and the pipe 62 which communicates with the chamber 42 immediately above the diaphragm 43. When the pressure in such parts is sufficient to overcome the tension of the spring 47, the diaphragm will be forced downwardly and cause the opening through the port 45 to be more or less closed, thereby shutting off to some extent, or entirely, the gas from the burner 29 or by decreasing the opening aforesaid, correspondingly reducing the size of the flame produced by the burner. The tension of the spring 47 may be varied by means of the adjusting screw 48 so that the movement of the diaphragm 43 will require a higher or lower temperature, as the case may be, within the vessel 14, to operatively affect the diaphragm 43 in a manner heretofore described. If the tension of spring 47 is increased by means of the screw 48, the operation of the diaphragm will be unaffected until the water has been substantially exhausted from the vessel 14 and a dry heat is caused to pass out through the openings 67 and down the flue 66, thereby affecting the fluid contained within the chamber or receptacle 64 to a greater extent than when steam only passes through said flue. By this means the contents of the vessel 14 is protected against burning, as it is practically impossible to produce an intense heat from the burner 29 after the water has been exhausted from the vessel. Now if the top 17 be raised for any purpose, the heat contained in the flue 66, the lower end of which is open, will be forced out by a reverse draft of relatively cold air entering the bottom of the flue and passing out through the openings 67, thereby cooling the receptacle 64 and permitting gas to enter the burner to increase the size of the flame and consequently a corresponding increase of heat. When the top 17 is raised the vessel 14 may be readily removed from the jacket 10 as may also the flue wall 65 attached to the vessel 14 and encompassing the receptacle 64, without disturbing any of the automatically regulating gas devices.

In Fig. 1 I show three vessels 70, 71, and 72, that may be placed in the vessel 14 for containing separate articles of food, and it will be observed that these vessels extend above the upper edge of the jacket 10 so that they may be readily removed when the top is raised.

A stand 73 is provided with a rim 74 which surrounds the device and prevents its accidental displacement. The stand is also provided with three inwardly extending arms 75, near its bottom, to provide a rest for a receptacle 56. In said figure, a hose 77 is shown connected to the gas burner.

78 indicates an illuminated opening, ordinarily closed by a plate of mica, or the like, secured to a sliding door, which latter is operable by a knob 79, for the purpose of permitting inspection of the interior of the casing 10, or for lighting the burner 60. The flame may be seen through the substantially transparent panel, covering the opening in the door, without the necessity of opening the door.

While I have herein shown and described a single embodiment of my invention for the purpose of clear disclosure, it is evident that changes may be made therein without departing from the spirit and scope of the appended claims.

What I claim is:

1. A device of the character described comprising a cooking vessel and a substantially tight fitting top therefor; controllable means for fuel for heating the contents of said vessel; a responsive means for controlling said fuel controllable means; a jacket opened at one end into said vessel and at its other end to the atmosphere, said jacket surrounding said heat responsive means whereby heated vapor escaping from said vessel must pass through said jacket, around said responsive means, when the vessel is closed, and a cooling blast of air will pass through said jacket when said vessel is open.

2. A device of the character described comprising a cooking vessel and a substantially tight fitting top therefor; a controllable means for fuel for heating the contents of said vessel; a heat responsive means for controlling said fuel controllable means; a vertically disposed jacket secured to said vessel, open at its upper end into said vessel and at its bottom end to the atmosphere, said jacket surrounding said heat responsive means, whereby heated vapor escaping from said vessel must pass down through said jacket around said responsive means, when the vessel is closed, and a cooling draft of air will pass upwardly through said jacket when said vessel is open.

3. A device of the character described comprising a cooking vessel and a substantially tight fitting top therefor; a jacket surrounding said vessel providing thereby a combustion chamber; a fuel burner supported by and in the lower part of said jacket for heating the contents of said vessel; a smaller jacket attached to the side wall of said cooking vessel, said jacket open at its upper end into said vessel and at its lower end into said combustion chamber; a fuel controlling means supported by said jacket and burner, and a heat responsive means for controlling said burner inclosed in said smaller jacket.

In testimony whereof I hereunto set my hand in the presence of two witnesses.

NOAH S. HARTER.

In the presence of—
J. J. DIETMEYER,
A. L. ROGERS.